US011942034B2

(12) United States Patent
Huitema et al.

(10) Patent No.: US 11,942,034 B2
(45) Date of Patent: Mar. 26, 2024

(54) PIXEL DRIVER REDUNDANCY SCHEMES

(71) Applicant: Apple Inc., Cupertino, CA (US)

(72) Inventors: Hjalmar Edzer Ayco Huitema, Lexington, MA (US); Hopil Bae, Sunnyvale, CA (US); Kapil V. Sakariya, Los Altos, CA (US); Mahdi Farrokh Baroughi, Santa Clara, CA (US); Stanley B. Wang, Cupertino, CA (US); Tore Nauta, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/905,411

(22) PCT Filed: Feb. 23, 2021

(86) PCT No.: PCT/US2021/019271
§ 371 (c)(1),
(2) Date: Aug. 31, 2022

(87) PCT Pub. No.: WO2021/202015
PCT Pub. Date: Oct. 7, 2021

(65) Prior Publication Data

US 2023/0162677 A1 May 25, 2023

Related U.S. Application Data

(60) Provisional application No. 63/002,905, filed on Mar. 31, 2020.

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0866* (2013.01); *G09G 2310/0275* (2013.01)

(58) Field of Classification Search
CPC ............... G09G 3/3233; G09G 3/3266; G09G 2300/0866; G09G 2310/0275;
(Continued)

(56) References Cited

U.S. PATENT DOCUMENTS 6,121,961 A * 9/2000 Feldman .................. G09G 3/20 345/204
10,411,210 B2 * 9/2019 Bibl ........................ H01L 24/24
(Continued)

FOREIGN PATENT DOCUMENTS

KR 20130116126 A * 10/2013
WO 2016/200634 A1 12/2016
(Continued)

OTHER PUBLICATIONS

International Search Report and Written Opinion for International Application No. PCT/US2021/019271, dated Apr. 20, 2021.

*Primary Examiner* — Amy Onyekaba
(74) *Attorney, Agent, or Firm* — Aikin & Gallant, LLP

(57) ABSTRACT

Display panel redundancy schemes and redundancy building blocks are described. In an embodiment, pixel driver chips are connected to both primary and redundant strings of LEDs within a local passive matrix, and driver terminal switches within the pixel driver chip are used to select either the primary or redundant strings of LEDs.

21 Claims, 11 Drawing Sheets

(58) Field of Classification Search
CPC ................. G09G 2300/06; G09G 3/32; G09G 2300/0426; G09G 2310/0278; G09G 2330/08
See application file for complete search history.

(56) References Cited

U.S. PATENT DOCUMENTS

| | | | | |
|---|---|---|---|---|
| 10,417,964 | B1 * | 9/2019 | Lo | H10K 59/12 |
| 2002/0063533 | A1 * | 5/2002 | Swallow | G09G 3/20 315/169.3 |
| 2014/0168037 | A1 * | 6/2014 | Sakariya | G09G 3/3233 345/82 |
| 2017/0025075 | A1 * | 1/2017 | Cok | G09G 3/2003 |
| 2017/0270852 | A1 * | 9/2017 | Meitl | G09G 3/3216 |
| 2018/0090059 | A1 * | 3/2018 | Baroughi | G09G 3/006 |
| 2018/0211582 | A1 * | 7/2018 | Sakariya | G09G 3/32 |
| 2019/0080970 | A1 * | 3/2019 | Chaji | H01L 22/24 |
| 2019/0347985 | A1 * | 11/2019 | Shaeffer | G09G 3/2003 |
| 2019/0385509 | A1 * | 12/2019 | Lu | G09G 3/3275 |

FOREIGN PATENT DOCUMENTS

| | | | | |
|---|---|---|---|---|
| WO | 2016/200635 | A1 | 12/2016 | |
| WO | WO-2016200635 | A1 * | 12/2016 | G09G 3/2014 |
| WO | 2019/217070 | A1 | 11/2019 | |

* cited by examiner

FIG. 7C"

PIXEL DRIVER REDUNDANCY SCHEMES

CROSS-REFERENCE TO RELATED APPLICATIONS

This patent application is a U.S. National Phase Application under 35 U.S.C. § 371 of International Application No. PCT/US2021/019271, filed Feb. 23, 2021, entitled Pixel DRIVER REDUNDANCY SCHEMES, which claims the benefit of priority of U.S. Provisional Application No. 63/002,905, filed Mar. 31, 2020, both of which are incorporated herein by reference.

BACKGROUND

Field

Embodiments described herein relate to a display system, and more specifically to redundancy schemes to increase display yield.

Background Information

Display panels are utilized in a wide range of electronic devices. Common types of display panels include active matrix display panels where each pixel element, e.g. light emitting diode (LED), may be individually driven to display a data frame, and passive matrix display panels where rows and columns of pixel elements may be driven in a data frame. Frame rate can be tied to display artifacts and may be set at a specified level based on display application.

Conventional organic light emitting diode (OLED) or liquid crystal display (LCD) technologies feature a thin film transistor (TFT) substrate. More recently, it has been proposed to replace the TFT substrate with an array of pixel driver chips (also referred to as micro driver chips, or microcontroller chips) bonded to a substrate and to integrate an array of micro LEDs (μLEDs) with the array of pixel driver chips, where each pixel driver chip is to switch and drive a corresponding plurality of the micro LEDs. Such micro LED displays can be arranged for either active matrix or passive matrix addressing.

In one implementation described in U.S. Publication No. 2019/0347985 a local passive matrix (LPM) display includes an arrangement of pixel driver chips and LEDs in which each pixel driver chip is coupled with an LPM group of LEDs arranged in display rows and columns. In operation global data signals are transmitted to the pixel driver chip, and each display row of LEDs in the LPM group is driven by the pixel driver chip one display row at a time. In particular, the pixel driver chips can include distinct driver portions, or slices, to provide redundancy for defective or inactive pixel driver chips. In an exemplary implementation, an LPM group of LEDs includes an arrangement of primary LEDs coupled to a primary pixel driver chip, and an overlapping arrangement of redundant LEDs coupled to an adjacent redundant pixel driver chip. In the event of a defective primary pixel driver chip, or primary LED, the connecting slice of the primary pixel driver chip is deactivated while the redundant pixel driver chip is activated to drive the redundant LEDs in the LPM group.

SUMMARY

Embodiments describe various redundancy building blocks to achieve specific pixel driver redundancy configurations within a display panel. For example, the various redundancy building blocks include driver terminal switches to select primary or redundant strings of LEDs, selective building block redundancy features, and redundant pixel driver circuits. Various combinations may be utilized to increase manufacturing yield percentages, increase LED matrix size, and reduce the amount of silicon or number of pixel driver chips needed to operate the display panel.

BRIEF DESCRIPTION OF THE DRAWINGS

FIG. 7C" is a schematic top view illustration of a redundancy scheme including pixel driver chips with driver terminal switches and a redundant pixel driver circuit arranged in a redundancy scheme with single pixel driver chips in accordance with an embodiment.

DETAILED DESCRIPTION

Figure 1A:
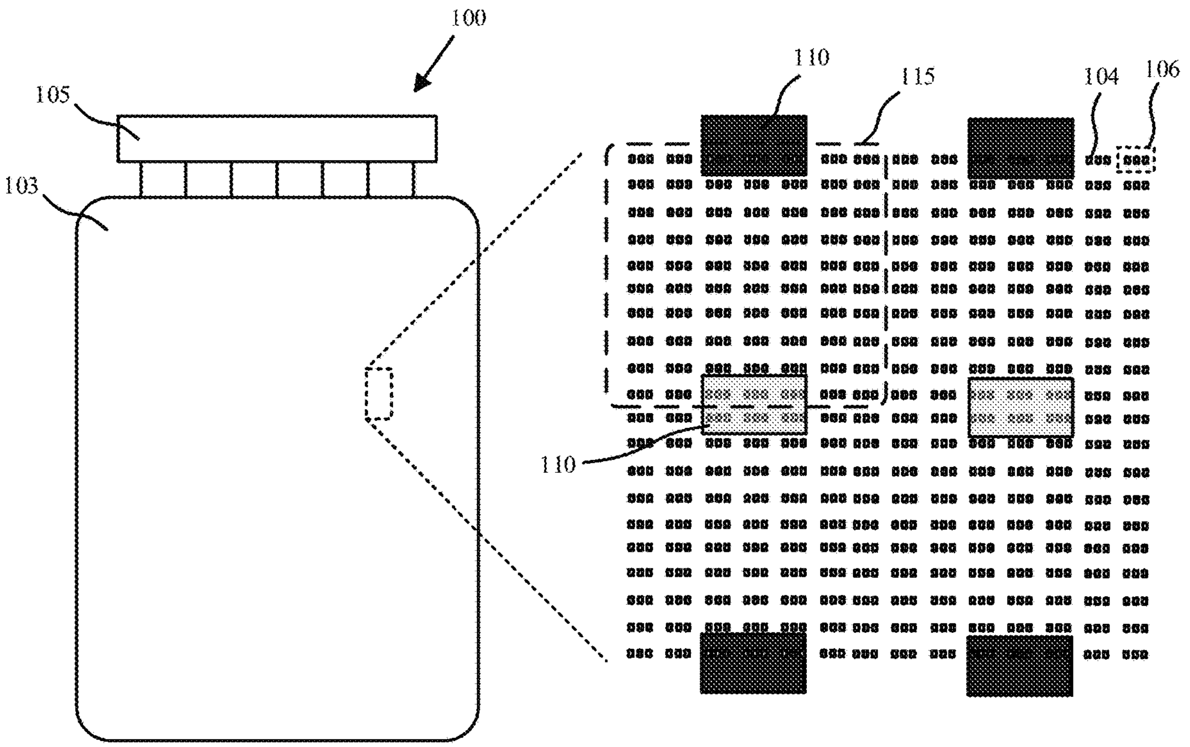
FIG. 1A is a schematic top view illustration of a display system in accordance with an embodiment.

Embodiments describe various pixel driver chip redundancy schemes that can increase display yield, and hence expand LED matrix size, and reduce display cost. In particular, it has been observed that pixel driver chip defects, commonly characterized in defective parts per million (DPPM), affect minimum manufacturing yield percentages for displays. For example, the pixel driver chips may have x-y dimensions on the order of tens to hundreds of microns, and include several tens of contact/terminal pads. Due to the size limitations of the contact/terminal pads it may be difficult to test individual pixel driver chips at the wafer scale using traditional probing techniques. This can result in defective pixel driver chips being transferred and integrated into a display panel.

An exemplary integration sequence in accordance with embodiments may include fabricating pixel driver chips at a wafer scale and transferring a plurality of pixel driver chips from one or more donor substrates to a display substrate. A redistribution layer (RDL) is then formed for electrical routing to/from the pixel driver chips and formation of LED driver pads. Testing may optionally be performed using the RDL to determine operability of the transferred pixel driver chips, followed by transfer of arrays of LEDs to the display substrate and bonding to the driver pads. The various pixel driver chip redundancy schemes in accordance with embodiments may mitigate risk of integrating fully or partially defective pixel driver chips into a display panel, and thus increase manufacturing yield.

In an embodiment, a display panel includes an array of pixel driver chips connected to a corresponding array of LED matrices. For example, each LED matrix can be a local passive matrix (LPM) of LEDs that is locally operated by an adjacent pixel driver chip or pair of pixel driver chips. As a repeating pattern, the array of LED matrices can include a first LED matrix and a second LED matrix, with the array of pixel driver chips including a first pixel driver chip connected to the first LED matrix and the second LED matrix. Thus, the pixel driver chip can operate at least a portion of both LED matrices. The pixel driver chip may also be configured to operate primary/redundant pairs of strings of LEDs within each matrix. In an embodiment, the first LED matrix includes a plurality of first primary strings of LEDs and a plurality of first redundant strings of LEDs, and the second LED matrix includes a plurality of second primary strings of LEDs and a plurality of redundant strings of LEDs. In an embodiment, pixel driver chip includes a first group of first output drivers to drive the plurality of first primary strings of LEDs in the first LED matrix, and a second group of output drivers to drive the plurality of second redundant strings of LEDs in the second LED matrix. In such an embodiment, each first output driver can be connected to a corresponding first driver terminal switch, such as a tristate switch, to select either a first primary driver terminal or a first redundant driver terminal. Each second output driver may be connected to a second driver terminal switch, such as a tristate switch, to select either a second primary driver terminal or a second redundant driver terminal.

In one aspect, various pixel driver redundancy schemes are described which can increase the allowable number of DPPM of pixel driver chips while maintaining acceptable manufacturing yield percentage, and increased LED matrix size (e.g. LPM size). In accordance with some embodiments, both primary and redundant strings of LEDs within an LED matrix can be connected to terminals for two adjacent pixel driver chips. Each pixel driver chip may include a switching circuitry to select either the primary string of LEDs or redundant string of LEDs. Such redundancy configurations may accommodate an increased number of DPPM of pixel driver chips. In some embodiments, the pixel driver chips can include an additional redundancy circuit coupled between the first and send pixel driver circuitries in order to provide a shared pixel driver circuit redundancy.

In another aspect, various pixel driver redundancy schemes are described which can drive down display cost by driving down total silicon, or number of pixel driver chips while maintaining acceptable manufacturing yield percentage, and increased LED matrix size (e.g. LPM size). Such a redundancy configuration can leverage additional redundancy configurations provided with switching circuitry and/or shared pixel driver circuit redundancy within the pixel driver chips. In accordance with some embodiments, both primary and redundant strings of LEDs within an LED matrix are connected to driver terminals of a single pixel driver chip. Where DPPM tolerances are maintained, such an arrangement may facilitate a reduced number of pixel driver chips.

The LPM displays in accordance with embodiments may be implemented in both large area displays, as well as high resolution displays with high pixel density. Furthermore, LED and pixel driver chip sizes are scalable from macro to micro sized. In an embodiment, the pixel driver chips may have a length with a maximum dimension of less than 400 μm, or even less than 200 μm, with LED maximum dimensions of less than 100 μm, or even less than 20 μm, such as less than 10 μm, or even less than 5 μm for displays with high resolution and pixel density.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

The terms "above", "over", "to", "between", and "on" as used herein may refer to a relative position of one layer with respect to other layers. One layer "above", "over", or "on" another layer or bonded "to" or in "contact" with another layer may be directly in contact with the other layer or may have one or more intervening layers. One layer "between" layers may be directly in contact with the layers or may have one or more intervening layers.

Referring now to FIG. 1A a cross-sectional side view illustration is provided of a display system 100 in accordance with an embodiment. As shown in FIG. 1A, the display system includes rows of pixel driver chips 110. Each pixel driver chip 110 may include two portions or slices 0, 1 for operation of LED matrices 115 above and under the pixel driver chip 110. The slices 0, 1 may be separated into primary/redundant configurations, or master/slave configurations. Each LED matrix 115 may include a plurality of LEDs 104 and a plurality of pixels 106. In some configurations, the rows of pixel driver chips 110 are arranged in rows with every other row being a row of primary pixel driver chips (e.g. row 1, 3, etc.) or row of redundant pixel driver chips (e.g. row 2, 4, etc.). It is to be appreciated that the number and size of the pixel driver chips 110 within the display area is not necessarily drawn to scale, and is enlarged for illustrational purposes.

Generally, the display system 100 may include a display panel 103 including a display area with pixels 106 of LEDs 104, optional column drivers, optional row drivers, and an external control circuit 105 that is attached with the display panel 103 to supply various control signals, video signals, and power supply voltage to the display panel 103.

Figure 1B:
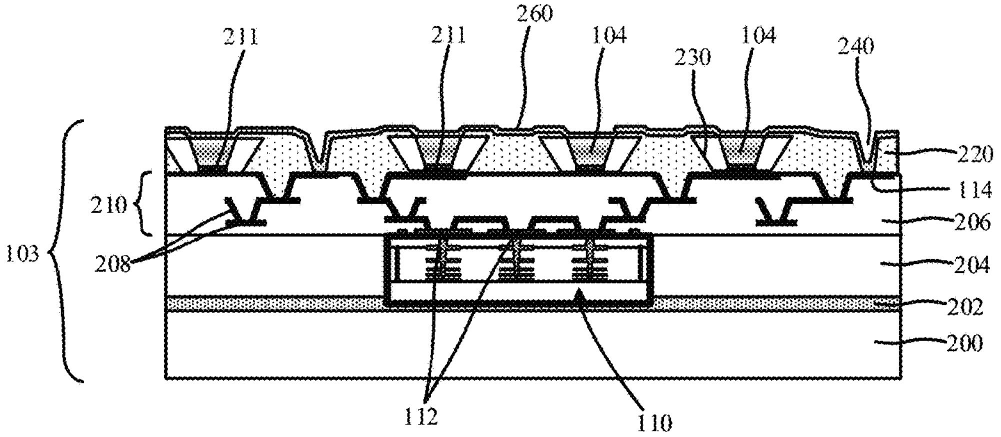
FIG. 1B is a close-up schematic cross-sectional side view illustration of a portion of display panel in accordance with an embodiment.

FIG. 1B is a close-up schematic cross-sectional side view illustration of a portion of display panel in accordance with an embodiment. Method of manufacture may include transferring an array of pixel driver chips 110 to a display substrate 200. For example, the display substrate 200 may be a rigid or flexible substrate, such as glass, polyimide, etc. An adhesion layer 202 may optionally be formed on the display substrate 200 to receive the pixel driver chips 110. Transfer may be accomplished using a pick and place tool. In an embodiment, a back side (non-functionalized) side is placed onto the adhesion layer 202, with the front side (active side, including contact pads 112) placed face up. The contact (terminal) pads 112 may be formed before or after transfer. As illustrated, a passivation layer 204 can be formed around the pixel driver chips 110, for example, to secure the pixel driver chips 110 to the display substrate 200, and to provide step coverage for additional routing. Suitable materials for passivation layer 204 include polymers, spin on glass, oxides, etc. In an embodiment, passivation layer is a thermoset material such as acrylic, epoxy, benzocyclobutene (BCB), etc.

Figure 4A:
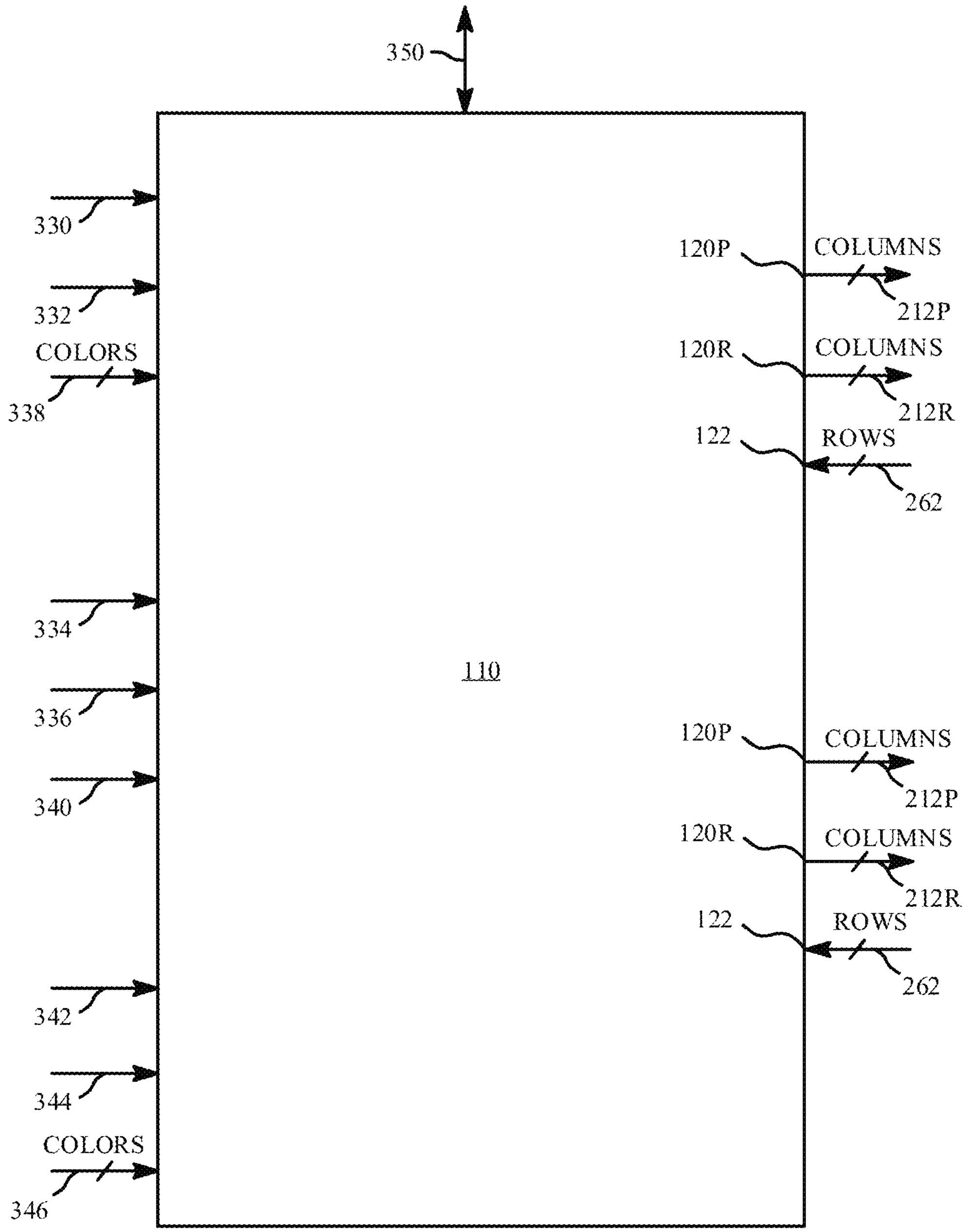
FIG. 4A is a schematic illustration of input/output terminals for a pixel driver chip in accordance with an embodiment.

A redistribution layer (RDL) 210 may then be formed over the array of pixel driver chips 110. The RDL may, for example, fan out from the contact (terminal) pads 112 and additionally may include routing to/from control circuit 105. The RDL 210 may include one or more redistribution lines 208 and dielectric layers 206. For example, redistribution lines 208 may be metal lines (e.g. Cu, Al, etc.) and the dielectric layers 206 may be formed of suitable insulating materials including oxides (e.g. SiOx), nitrides, polymers, etc. In accordance with embodiments, RDL 210 includes one or more of the plurality global signal lines and power lines (e.g. data signal 350, row synchronization signal 334, frame synchronization signal 336, and vertical synchronization token (VST) 340, Vdd, etc., see FIG. 4A). Still referring to FIG. 1B, RDL 210 additionally includes driver pads 211 for LEDs. In accordance with some embodiments, strings of LEDs may be connected to a corresponding interconnect (e.g. string, or line).

At this stage in the manufacturing process, the partially fabricated display panel 103 may be tested to determine operability of the pixel driver chips 110. For example, this may be done by probing the driver pads 211 or other test circuitry formed within the RDL 210. For example, the RDL 210 can include a test circuit with test pads at an edge of the display panel 103 which can be probed to test functionality of the pixel driver chips 110. This testing can be performed before or after transfer of the LEDs 104. In an embodiment, the test circuit can be removed from the edge of the display panel 103 after testing. In some embodiments, the pixel driver chips 110 may be wholly or partially activated or deactivated based upon test results. For example, an entire pixel driver chip can be deactivated, or only a specific slice. Furthermore, specific driver terminal switches can be programmed to select either primary or redundant driver terminals. Thus, redundancy and selectivity can be at a finer granularity than slice level. It is to be appreciated however that it is not necessary to program the pixel driver chips at this stage.

The display panel may now be suitable for subsequent processing for both micro LED and OLED. In an OLED manufacturing process, this may include deposition of the organic emission layers, and pixel defining layers. In the micro LED manufacturing process illustrated in FIG. 1B, additional dielectric layers and routing layers may optionally be formed followed by the transfer and bonding of micro LEDs 104 onto the stack-up. In an embodiment, the micro LEDs 104 are optionally bonded inside bank structure openings 230 in a bank layer 220. The bank structure openings 230 may optionally be reflective, and may optionally be filled after bonding of the micro LEDs 104. The bank layer 220 may be further patterned to create openings 240 to expose a routing layer, such as (e.g. negative) voltage power supply lines 114, or cathodes. A top transparent or semi-transparent electrically conductive layer(s) 260 can then be deposited to provide electrical connection from the top sides of the micro LEDs 104 to the voltage power supply lines, or cathodes. Suitable materials include transparent conductive oxides (TCOs), conductive polymers, thin transparent metal layers, etc. Further processing may then be performed for encapsulation, polarizer, etc.

Figure 2A:
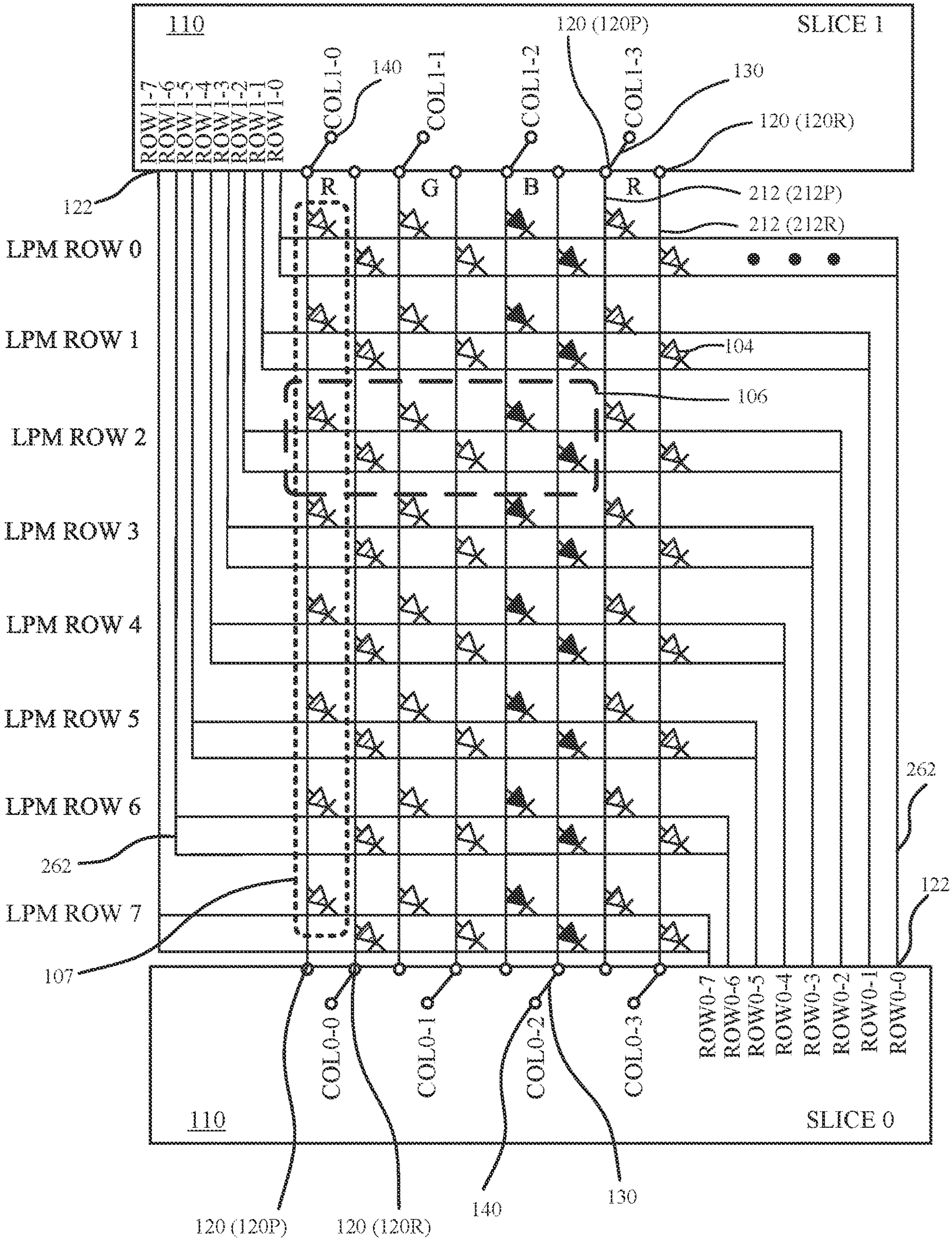
FIG. 2A is a schematic diagram of an LED matrix including redundant pairs of LEDs being driven by adjacent pairs of pixel driver chips in accordance with an embodiment.

Referring now to FIG. 2A, a schematic diagram is provided of an LED matrix including redundant pairs of LEDs capable of being driven by adjacent pairs of pixel driver chips 110. In particular, FIG. 2A is an illustration of a top pixel driver chip 110 with lower slice 1, and lower pixel driver chip 110 with upper slice 0 both connected to an LED matrix 115. The slices 0, 1 may be separated into primary/redundant configurations, or master/slave configurations, for example. It is to be appreciated, that usage of the term "slice" is simplified, and in no way suggests a geometric split of circuitry within the pixel driver chips 110, and instead is a simplistic reference to top and bottom connections in the illustration.

In the embodiment illustrated, the columns of LEDs 104 correspond to different emission colors of LEDs, such as red (R), green (G), blue (B) in an RGB pixel arrangement. Each column of LEDs 104 may also be a string 107 of LEDs. Alternative pixel arrangement may also be used. The illustrated number of rows and columns of LEDs within the LED matrix is exemplary, and embodiments are not so limited. For example, additional columns of LEDs would be included to share a pixel with the red (R) LEDs 104 in the fourth column.

In the illustrated embodiment, both portions, slice 1 of the lower pixel driver chip 110 and slice 0 of the upper pixel driver chip 110 include driver terminals 120 (e.g. contact pads 112 of FIG. 1B) coupled to the same strings 107 of LEDs with (e.g. drive-side) interconnects 212. Conversely, the adjacent pixel driver chips 110 include row terminals 122 (e.g. e.g. contact pads 112 of FIG. 1B) coupled with redundant, rows of LEDs with row interconnects 262. Row interconnects 262 may be a combination of top transparent or semi-transparent electrically conductive layer(s) 260 and (negative) voltage power supply line 114 (e.g. cathode) that connect a string 107 of LEDs 104 to a row terminal 122.

Row terminals 122 may be coupled with corresponding row-line switches and level shifters within the pixel driver chip 110, and the driver terminals 120 may be coupled with output drivers 140 of the pixel driver chip 110 and with driver terminal switches 130. Row interconnects 262 may connect to electrodes (e.g. cathodes) of a row of LEDs 104 to corresponding row-line switches and level shifters, while interconnects 212 may connect electrodes (e.g. anodes) of a column of LEDs 104 to corresponding output drivers 140, or vice-versa.

Specifically, the redundant driver terminals 120R may be coupled to redundant interconnects 212R corresponding to a string 107, or column, of redundant LEDs 104, while primary driver terminals 120P may be coupled to primary interconnects 212P corresponding to a string 107, or column, of primary LEDs 104. Further, the row terminals 122 of slice 1 of the upper pixel driver chip 110 and slice 0 of the lower pixel driver chip 110 may each be coupled to a row interconnect 262 corresponding row of primary and redundant LEDs 104 also coupled to the columns of primary interconnect lines 212P and redundant interconnect lines 212R. In this manner, slice 1 of the upper and slice 0 of the lower pixel driver chips 110 share the same timing associated with the same matrix 115.

In the particular embodiment illustrated in FIG. 2A, an LED matrix 115 is connected to two adjacent pixel driver chips 110. In such an embodiment, the plurality of rows of interconnects 262 are connected between a first plurality of row terminals 122 of the first pixel driver chip (e.g. slice 1) and a corresponding second plurality of row terminals 122 of the second pixel driver chip (e.g. slice 0), where each row interconnect 262 of the plurality of row interconnects is coupled to both the plurality of first redundant strings of LEDs (connected to redundant interconnect lines 212R) and the plurality of first primary strings of LEDs (connected to primary interconnect lines 212P) in the LED matrix. As shown, redundancy is not necessary with row terminals 122.

In some embodiments including backup pixel driver chips, a master portion, or slice 0, of each pixel driver chip is default active for each pixel driver chip, and the slave portion, or slice 1, of each pixel driver chip is default inactive. Thus, a slave or redundant portion only becomes active if a master or primary portion from an adjacent pixel driver chip is defective, or inactive. In some embodiments, both portions or slices 0, 1 of a primary pixel driver chip are default active, while the corresponding portions or slices 0, 1 of a redundant pixel driver chip are default inactive. Thus, a portion, or whole, of a redundant pixel driver chip only becomes active if an adjacent primary pixel driver chip portion is defective, or inactive. Alternatively, specific driver terminals and strings of LEDs can be activated in any suitable configuration at a granularity that is finer than slice level. Thus, entire slices need not be wholly active or inactive.

Figure 2B:
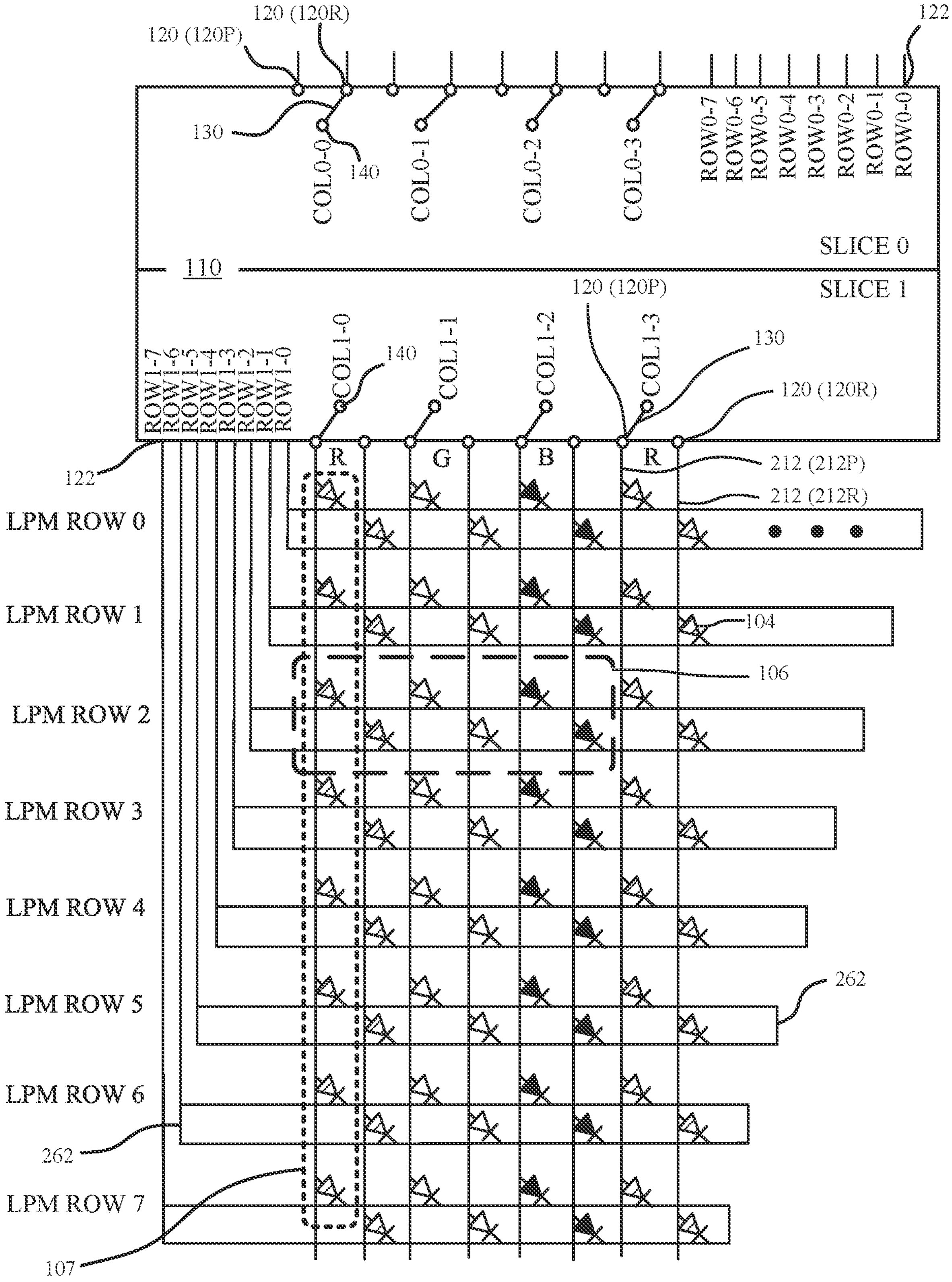
FIG. 2B is a schematic diagram of an LED matrix including redundant pairs of LEDs driven by a single pixel driver chip in accordance with an embodiment.

FIG. 2B is a schematic diagram of an LED matrix including redundant pairs of LEDs driven by a single pixel driver chip in accordance with an embodiment. As illustrated a plurality of row interconnects 262 are connected to a first plurality of row terminals 122 of only a single pixel driver chip (e.g. slice 1) where each row interconnect 262 of the plurality of row interconnects is coupled to both the plurality of first redundant strings of LEDs (connected to redundant interconnect lines 212R) and the plurality of first primary strings of LEDs (connected to primary interconnect lines 212P) in the LED matrix. As shown, redundancy is not necessary with row terminals 122.

Figure 3C:
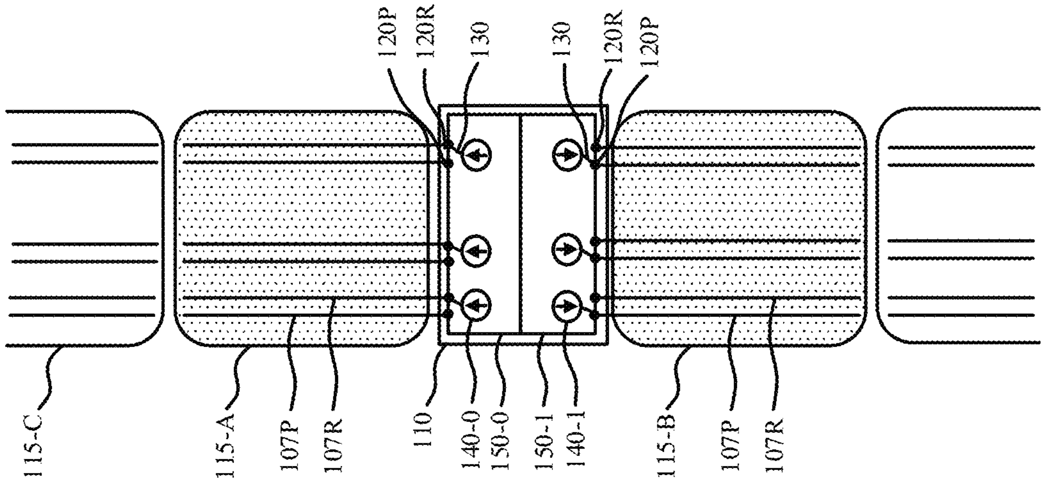
FIG. 3C is a schematic top view illustration of a redundancy scheme with single pixel driver chips in accordance with an embodiment.
Figure 3B:
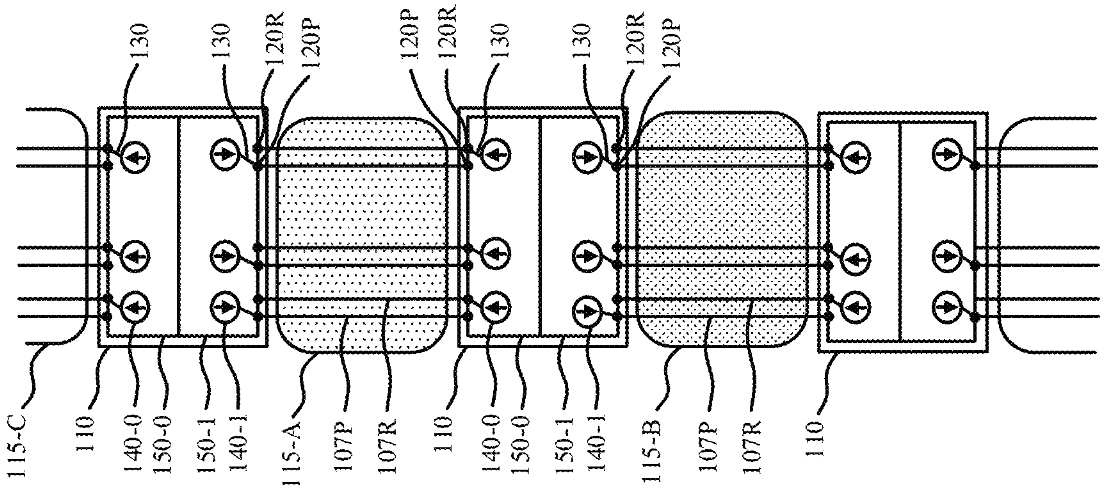
FIG. 3B is a schematic top view illustration of a redundancy scheme with back-up pixel driver chips in accordance with an embodiment.
Figure 3A:
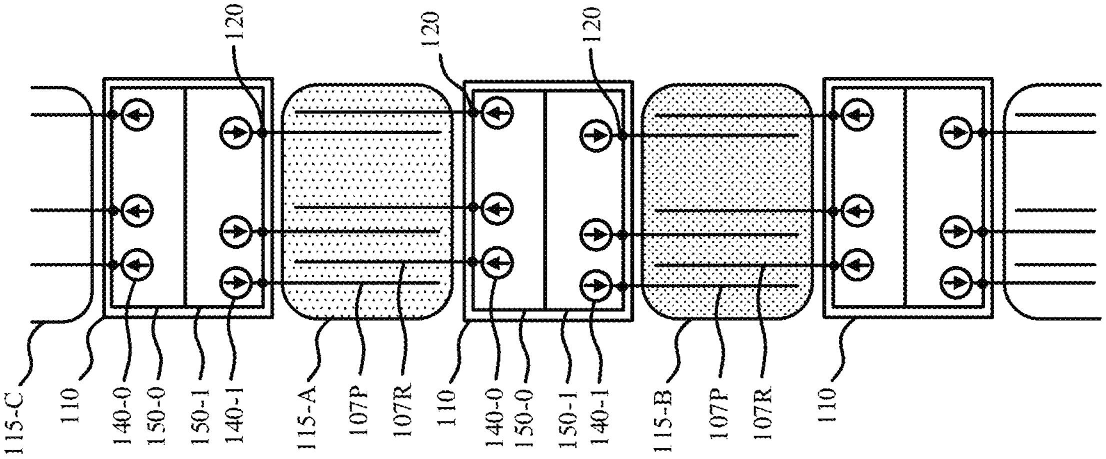
FIG. 3A is a schematic top view illustration of an up/down redundancy scheme.

Referring now to FIGS. 3A-3C various redundancy configurations are illustrate that may resemble that of the arrangement of pixel driver chips 110 and LED matrices 115 of FIG. 1A. FIG. 3A is a schematic top view illustration of an up/down redundancy scheme. As shown, each pixel driver chip 110 includes a first portion of pixel driver circuitry 150-0 (slice 0) and a second portion of pixel driver circuitry 150-1 (slice 1), the first and second portions of pixel driver circuitry optionally including independent logic (for example to receive and store control bits and pixel bits). In the implementation illustrated in FIG. 3A, each portion of pixel driver circuitry 150-0, 150-1 includes a plurality of output drivers 140, each output driver connected to a corresponding string 107 (primary strings 107P, redundant strings 107R) of LEDs via interconnects 212 (primary interconnects 212P, redundant interconnects 212R). In this configuration, a corresponding LED matrix 115 can be driven by a first portion pixel driver circuitry 150-0 (slice 0) of an upper pixel driver chip 110, or by a second portion of pixel driver circuitry 150-1 (slice 1) of a lower pixel driver chip 110.

FIG. 3B is a schematic top view illustration of a redundancy scheme with back-up pixel driver chips in accordance with an embodiment. In particular, FIG. 3B represents the same redundancy configuration as previously described with regard to FIG. 2A, and includes additional redundancy configurations compared to that of FIG. 3A such as interconnects 212 being to connected to both adjacent pixel drive chips 110, and each pixel driver chip 110 including driver switches 130 to select either connected primary interconnect 212P (and corresponding primary string 107P of LEDs) or redundant interconnect 212R (and corresponding redundant string 107R of LEDs).

In an embodiment, a display panel 103 includes an array of pixel driver chips 110 connected to a corresponding array of LED matrices 115, the array of LED matrices including a first LED matrix 115A and a second LED matrix 115B, and the array of pixel driver chips 110 including a first pixel driver chip (middle pixel driver chip in illustration) connected to the first LED matrix 115A and the second LED matrix 115B. In the illustrated embodiment, the first LED matrix includes a plurality of first primary strings 107P of LEDs and a plurality of first redundant strings 107R of LEDs, and the second LED matrix includes a plurality of second primary strings 107P of LEDs and a plurality of second redundant strings 170R of LEDs.

The first pixel driver chip 110 includes a first portion of pixel driver circuity 150-0 (slice 0) and a second portion of pixel driver circuitry 150-1 (slice 1), each portion optionally including independent logic (e.g. to receive control and pixel bits). The first portion of pixel driver circuitry 150-0 includes a first group of first output drivers 140-0 to drive the plurality of first primary strings 107P of LEDs in the first LED matrix 115A. The second portion of pixel driver circuitry 150-1 includes a second group of second output drivers 140-1 to drive the plurality of second redundant strings 107R of LEDs in the second LED matrix 115B. As shown, each first output driver 140-0 is connected to a corresponding first driver terminal switch 130 to select either a first primary driver terminal 120P or a first redundant driver terminal 120R of the first pixel driver chip 110, and each second output driver 140-1 is connected to a corresponding second driver terminal switch 130 to select either a second primary driver terminal 120P or a second redundant driver terminal 120R of the first pixel driver chip

110. For example, the driver terminal switches may be tristate switches. Still referring to the redundancy configuration of FIG. 3B, each first redundant string 107R of LEDs is connected to a corresponding first redundant driver terminal 120R, and each second primary string 107P of LEDs is connected to a corresponding second primary driver terminal 120P.

As shown, a second pixel driver chip 110 (top pixel driver chip) may be connected to the first LED matrix 115A and a third LED matrix 115C, the third LED matrix 115C similarly including a plurality of third primary strings 107P of LEDs and a plurality of third redundant strings 107R of LEDs. Likewise, the second pixel driver chip 110 (top pixel driver chip) may include a third group of third output drivers 140-0 to drive the plurality of third primary strings of LEDs 107P in the third LED matrix 115C, a fourth group of fourth output drivers 140-1 to drive the plurality of first redundant strings of LEDs 107R in the first LED matrix 115A. Each third output driver 140-0 is connected to a corresponding third driver terminal switch 130 to select either a third primary driver terminal 120P or a third redundant driver terminal 120R of the second pixel driver chip 110, and each fourth output driver 140-1 is connected to a corresponding fourth driver terminal switch 130 to select either a fourth primary driver terminal 120P or a fourth redundant driver terminal 120R of the second pixel driver chip.

As shown, the additional redundancy scheme of FIG. 3B connects both primary and redundant strings 107P, 107R of LEDs within an LED matrix to the primary and redundant driver terminals 120 (120P, 120R) for two adjacent pixel driver chips 110. Each pixel driver chip may additionally include driver terminal switches 130 to select either the primary string of LEDs or redundant string of LEDs. Such redundancy configurations may accommodate an increased number of DPPM of pixel driver chips by providing additional redundancy within each pixel driver chip. Thus, manufacturing yield may be improved, and/or LPM size can be increased. It is to be appreciated that the embodiment illustrated in FIG. 3B may additionally be combined with other redundancy configurations described herein, such as selective redundancy within functional blocks and shared pixel driver circuit redundancy.

Referring now to FIG. 3C is a schematic top view illustration is of a redundancy scheme with single pixel driver chips in accordance with an embodiment. FIG. 3C represents the same redundancy configuration as previously described with regard to FIG. 2B. As shown, each LED matrix 115 is driven by a single pixel driver chip 110, and the LED matrices 115 are not coupled to an output driver of another pixel driver chip 110 in the array of pixel driver chips. The pixel driver chips of FIG. 3C may be similar to that as previously described with regard to FIG. 3B. In this instance, the number of pixel driver chips 110 may be reduced, thus driving down display cost by driving down silicon cost. However, the lack of pixel driver chip redundancy may reduce the DPPM tolerance and the display panel yield may decrease. This can be balanced by decreasing LPM size, and hence LED matrix 115 size, while maintaining DPPM tolerances as attributed to the redundant strings 107P, 107R of LEDs and driver terminal switches 130.

In the particular configurations illustrated in FIGS. 3A-3C a first portion of pixel driver circuity 150-0 (slice 0) and a second portion of pixel driver circuitry 150-1 (slice 1) are illustrated as separate slices (slice 0, 1). In the exemplary implementations illustrated in FIGS. 3A-3B such slice redundancy can facilitate pixel driver chips redundancy, where adjacent pixel driver chips 110 can back up one another for corresponding LED matrices 115. In this manner, slices 0/1 of adjacent pixel driver chips 110 can share the same timing associated with the same matrix 115. Furthermore, slices 0/1 within a same pixel driver chip 110 can include independent logic to independently receive and store control bits and pixel bits. In the particular embodiment illustrated in FIG. 3C adjacent pixel driver chips 110 do not back up one another for a corresponding LED matrix 115. In such an embodiment the portions of pixel driver circuitry 150-0, 150-1 for separate slices may optionally include independent logic to independently receive and store control bits and pixels bits. Nevertheless, segregation into two or more portion of pixel driver circuitries 150-0, 1, . . . *n* can be utilized for testing functional groups (including groups of driver terminals, etc.), and may not require independent logic to independently receive and store control and pixel bits. Thus, it may not be required to test each individual pixel driver pad, etc. Furthermore, such grouping can be utilized for implementation of further functional block redundancy.

Referring now to FIG. 4, a high level schematic illustration is provided of input/output terminals for a pixel driver chip 110 in accordance with an embodiment from a data load point of view. Data scan is based on a raster scan using the vertical data 350 signals (e.g. originating from column driver) and the horizontal data clock signal 330, 342 (e.g. originating from a row driver, or hybrid pixel driver/row driver chip). Additionally illustrated in FIG. 4 are row terminals 122 for output to the LED row interconnects 262, and driver terminals 120 (primary driver terminals 120P, redundant driver terminals 120R) for LED column interconnects 212 (primary interconnects 212P, redundant interconnects 212R) for both portions (e.g. slices 0, 1) of the pixel driver chip 110 as previously described with regard to FIGS. 2A-2B.

Each slice 1/0, may receive a separate input for data clock 330, 342, configuration clock 332, 344, emission clock 338, 346 respectively. Additionally, each slice may include multiple emission clock inputs 338, 346 for separate LED colors (e.g. R, G, B). The pixel driver chip 110 may additionally include inputs for global signals such as a row synchronization signal 334, frame synchronization signal 336, and vertical synchronization token (VST) 340.

Figure 4B:
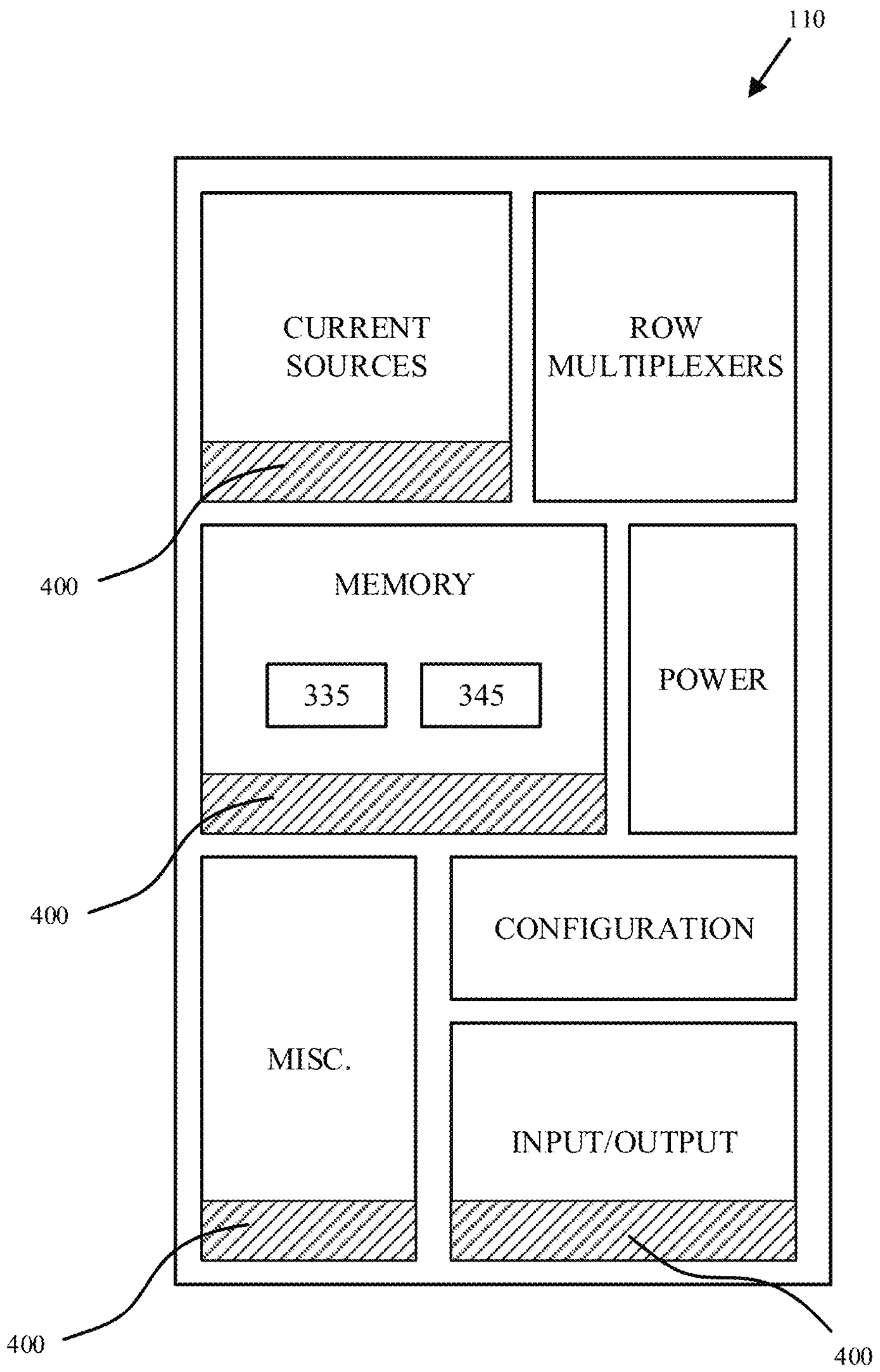
FIG. 4B is a schematic illustration of selective redundancy within functional blocks of a pixel driver chip in accordance with an embodiment.

In accordance with some embodiments, the first portion (e.g. slice 1) and the second portion (e.g. slice 0) for each pixel driver chip 110 can optionally independently receive (e.g. capture) control bits and pixel bits, to be stored in corresponding data registers 335, 345 (see FIG. 4B). In operation, configuration clock signals 332, 344 are transmitted to the slices of the pixel driver chip 110 to declare whether control (configuration) bits or pixel bits from the data signal 350 are to be updated. Control (configuration) bits or pixel bits for a pixel driver chip 110 slice are updated when the configuration clock signal 332, 344 goes high and overlaps the data clock 330, 342 for the corresponding slice 1/0.

In accordance with embodiments, the pixel driver chips 110 may alternatively or additionally include selective redundancy features. FIG. 4B is a schematic illustration of various functional blocks found within a pixel driver chip 110. As shown, selective redundancy 400 can be included within the various functional blocks, such as providing additional current sources/switches within the current source block, or providing memory/switches within the memory blocks, all of which may have corresponding redundant contact pads/terminals 402 (see FIG. 6). Such redundant contact pads/terminals 402 may also be part of contact pads 112 of FIG. 1B. Furthermore, redundant contact pads/terminals 402 may be made for global signal I/O such as for row synchronization signal 334, frame synchronization signal 336, and vertical synchronization token (VST) 340 as well as various power sources.

Figure 5:
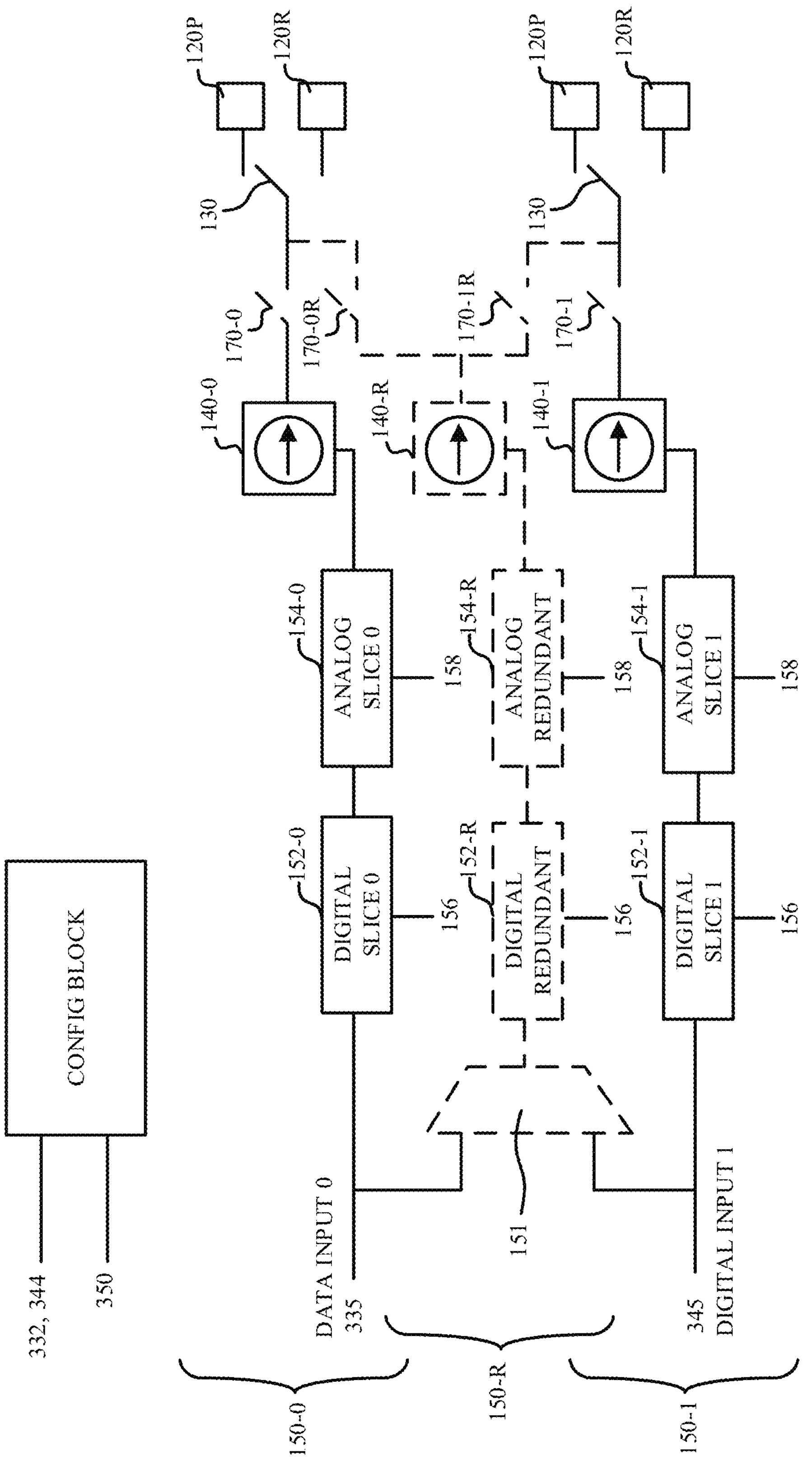
FIG. 5 is a circuit diagram of pixel driver chip with driver terminal switches and optional redundant pixel driver circuit in accordance with an embodiment.

Referring now FIG. 5 a partial circuit diagram is provided of pixel driver chip with driver terminal switches 130 and an optional redundant pixel driver circuit in accordance with an embodiment. Generally, FIG. 5 shows high level routing for slice redundancy including a redundancy circuit 150-R (e.g. a redundant slice) coupled between the first portion of pixel driver circuitry 150-0 (corresponding to slice 0) and the second portion of pixel driver circuitry 150-1 (corresponding to slice 1). As shown the respective pixel driver circuities can have digital blocks 152 and analog blocks 154. In the particular embodiment illustrated, data (e.g. digital) can be input to the digital slice 152-0, for example from data register 335. Data (e.g. digital) can be input to the digital slice 152-1, for example from data register 345. The digital blocks 152-0, 152-1 can input to optional analog blocks 154-0, 154-1, respectively, which are input to the output drivers 140-0, 140-1, respectively. For example, the analog blocks may provide the current source. Various signals 156, 158 are input to the various digital blocks 152 and analog blocks 154. For example, these may include emission clock, VST, etc. Similar to previous description, driver terminal switches 130 are connected to outputs of the output drivers 140 in order to select either the primary driver terminals 120P or redundant driver terminals 120R.

In an embodiment, the data (digital) inputs, e.g. from data registers 335, 345, are input into a multiplexer 151 of the redundancy circuit 150-R. The multiplexer 151 has an output to a redundant digital block 152-R, which is output to an optional redundant analog block 154-R which may operate similarly as the digital and analog blocks of slices 0/1. The redundant analog block 154-R may output a current source to the redundant output driver 140-R. In the embodiment illustrated, a first redundancy circuit selection switch 170-0R is located between the redundant output driver 140-R and the first driver terminal switch 130 (for slice 0). A second redundant selection circuit switch 170-1R is located between the redundant output driver 140-R and the first driver terminal switch 130 (for slice 1). Similarly, selection circuit switches 170-0 and 170-1 may be provided between the output drivers 140-0, 140-1 and their respective driver terminal switches 130.

As described with regard to FIG. 4B, selective redundancy features can be included for specific functional blocks, such as additional memory (e.g. data registers 335, 345), current sources (e.g. analog blocks 154), global signals associated with pixel data and control data latching, etc. In the particular embodiment illustrated in FIG. 5, redundancy is not needed with configuration block for the pixel driver chip 110.

Figures 6, 7A, 7B, 7C:
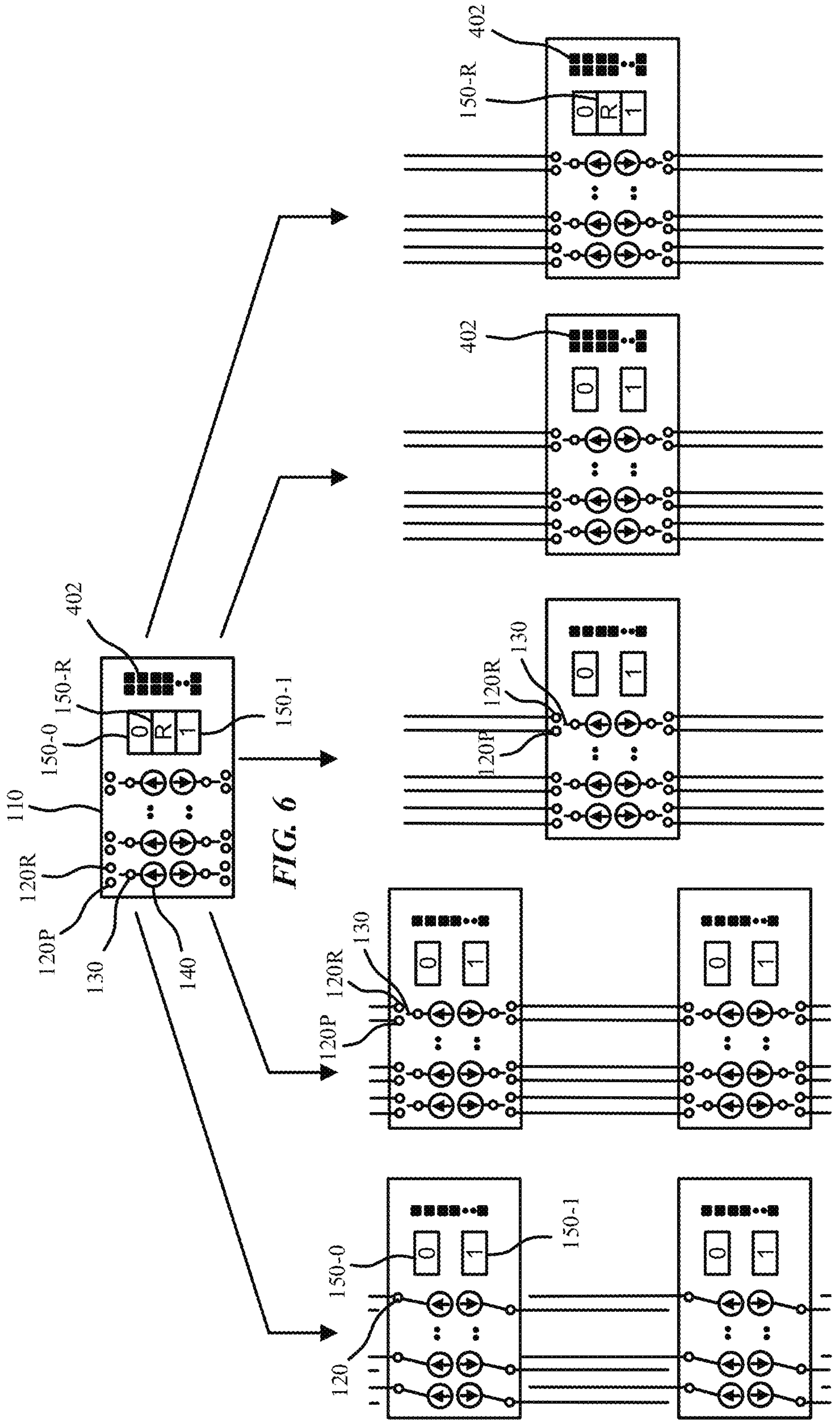
FIG. 6 is a schematic illustration of a pixel driver chip including a combination of redundancy building blocks in accordance with an embodiment.
FIG. 7A is a schematic top view illustration of a redundancy scheme including pixel driver chips with driver terminal switches arranged in an up/down redundancy scheme in accordance with an embodiment.
FIG. 7B is a schematic top view illustration of a redundancy scheme including pixel driver chips with driver terminal switches arranged in a redundancy scheme with back-up pixel driver chips in accordance with an embodiment.
FIGS. 7C-7C' are schematic top view illustrations of redundancy schemes including pixel driver chips with driver terminal switches arranged in a redundancy scheme with single pixel driver chips in accordance with an embodiment.

Up until this point, the building blocks for various redundancy configurations have been described separated, or in specific combinations. However, it is to be appreciated that the various building blocks can be combined to achieve a specified redundancy. FIG. 6 is a schematic illustration of a pixel driver chip 110 including a combination of redundancy building blocks that can be used in various embodiments. In particular, FIG. 6 illustrates the first portion of pixel driver circuitry 150-0 (corresponding to slice 0), the second portion of pixel driver circuitry 150-1 (corresponding to slice 1), as well as redundancy circuit 150-R. Also illustrated are the plurality of driver terminal switches 130 between the primary driver terminals 120P and redundant driver terminals 120R. Additionally, illustrated are redundant contact pads/terminals 402 corresponding to selective redundancy features. These various building blocks may be combined in a variety of suitable arrangements to manufacture pixel driver chips with the necessary amount of redundancy for minimum DPPM and LPM size.

FIG. 7A is a schematic top view illustration of a redundancy scheme including pixel driver chips with driver terminal switches 140 arranged in an up/down redundancy scheme. As shown, FIG. 7A does not implement the redundancy building blocks of driver terminal switches 130, redundancy circuit 150-R, or selective redundancy features with additional terminals 402.

FIG. 7B is a schematic top view illustration of a redundancy scheme including pixel driver chips with driver terminal switches arranged in a redundancy scheme with back-up pixel driver chips in accordance with an embodiment. As shown, FIG. 7B implements the redundancy building blocks of driver terminal switches 130. In this manner, each slice 0/1 of each pixel driver chip 110 can provide redundancy to a slice for an adjacent pixel driver chip 110. An exemplary manner of operation includes master/slave arrangements where slices are assigned as either primary or redundant as default, and reprogramming is only necessary in the event of a defect. Another manner of operation is for every other pixel driver chip in a column to be active or inactive (i.e. backup). Alternative, driver terminal switches 130 can be selected in any suitable manner to active combinations of primary and redundant driver terminals 120P, 120R.

FIGS. 7C-7C' are schematic top view illustrations of redundancy schemes including pixel driver chips with driver terminal switches arranged in a redundancy scheme with single pixel driver chips in accordance with an embodiment. Both FIGS. 7C-7C' implement the redundancy building blocks of driver terminal switches 130. In such single pixel driver chip arrangements, each LED matrix 115 is connected to only a single pixel driver chip 110. The embodiment illustrated in FIG. 7C' additionally includes redundant contact pads/terminals 402 corresponding to selective redundancy features.

FIG. 7C" is a schematic top view illustration of a redundancy scheme including pixel driver chips with driver terminal switches and a redundant pixel driver circuit arranged in a redundancy scheme with single pixel driver chips in accordance with an embodiment. The particular embodiment illustrated in FIG. 7C" is similar to that of FIG. 7C' with the addition of the redundancy circuit 150-R. It is to be appreciated that embodiments are not limited to the particular combinations specifically illustrated in FIGS. 7A-7C" and that the various redundancy building blocks described herein may be combined in any suitable manner. For example, implementations of FIGS. 7'-7" may be carried out without separate portions of pixel driver circuitry 150-0, 150-1, 150-R, . . . 150-*n*.

Figure 8:
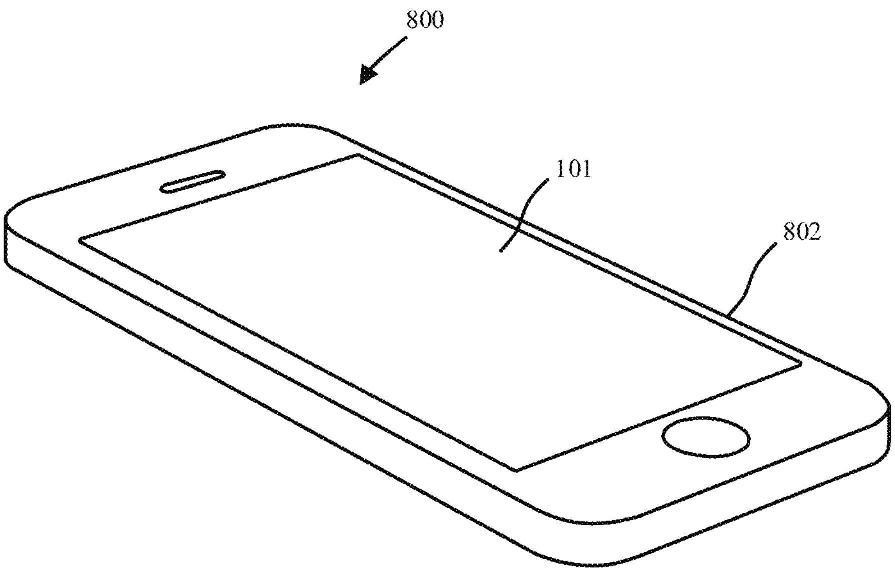
FIG. 8 is an isometric view of a mobile telephone in accordance with an embodiment.
Figure 9:
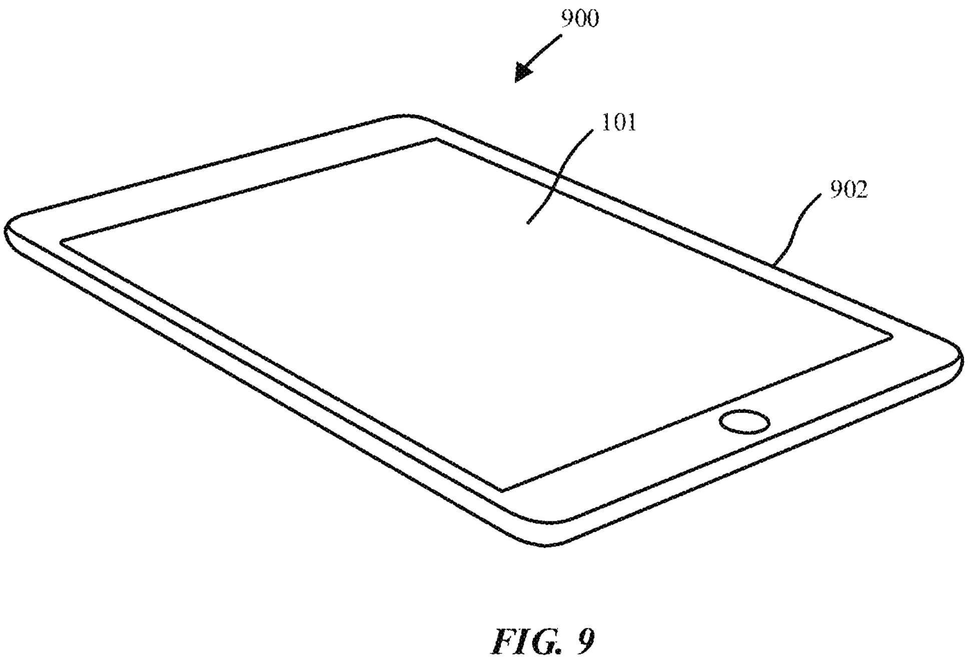
FIG. 9 is an isometric view of a tablet computing device in accordance with an embodiment.
Figure 10:
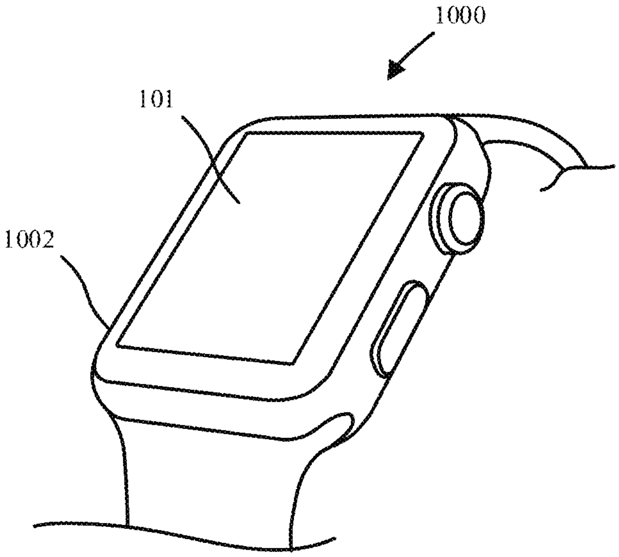
FIG. 10 is an isometric view of a wearable device in accordance with an embodiment.
Figure 11:
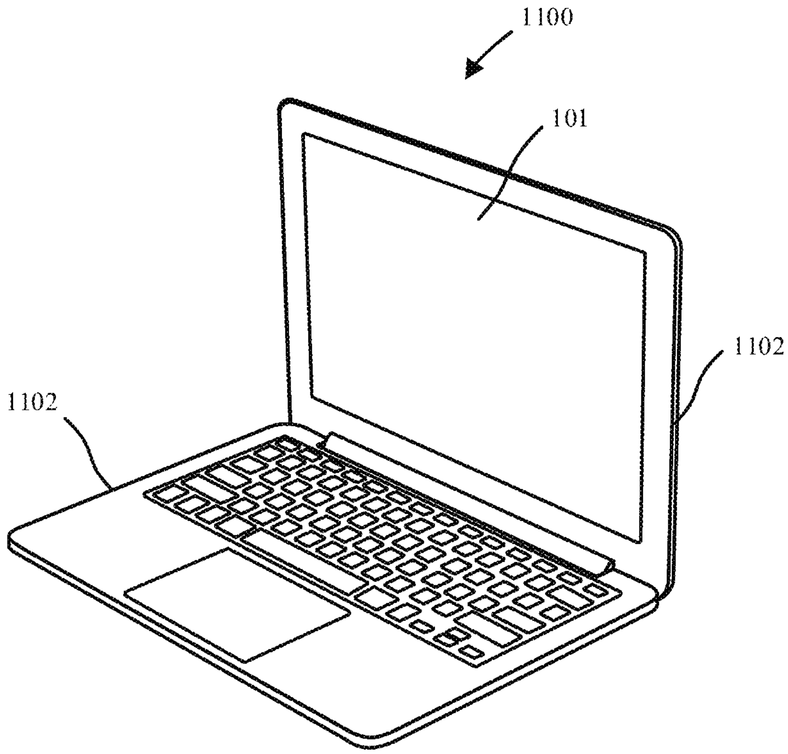
FIG. 11 is an isometric view of a laptop computer in accordance with an embodiment.

FIGS. 8-11 illustrate various portable electronic systems in which the various embodiments can be implemented. FIG. 8 illustrates an exemplary mobile telephone 800 that includes a display panel 103 including a display screen 101 packaged in a housing 802. FIG. 9 illustrates an exemplary tablet computing device 900 that includes a display panel 103 including a display screen 101 packaged in a housing 902. FIG. 10 illustrates an exemplary wearable device 1000 that includes a display panel 103 including a display screen 101 packaged in a housing 1002. FIG. 11 illustrates an exemplary laptop computer 1100 that includes a display panel 103 including a display screen 101 packaged in a housing 1102.

Figure 12:
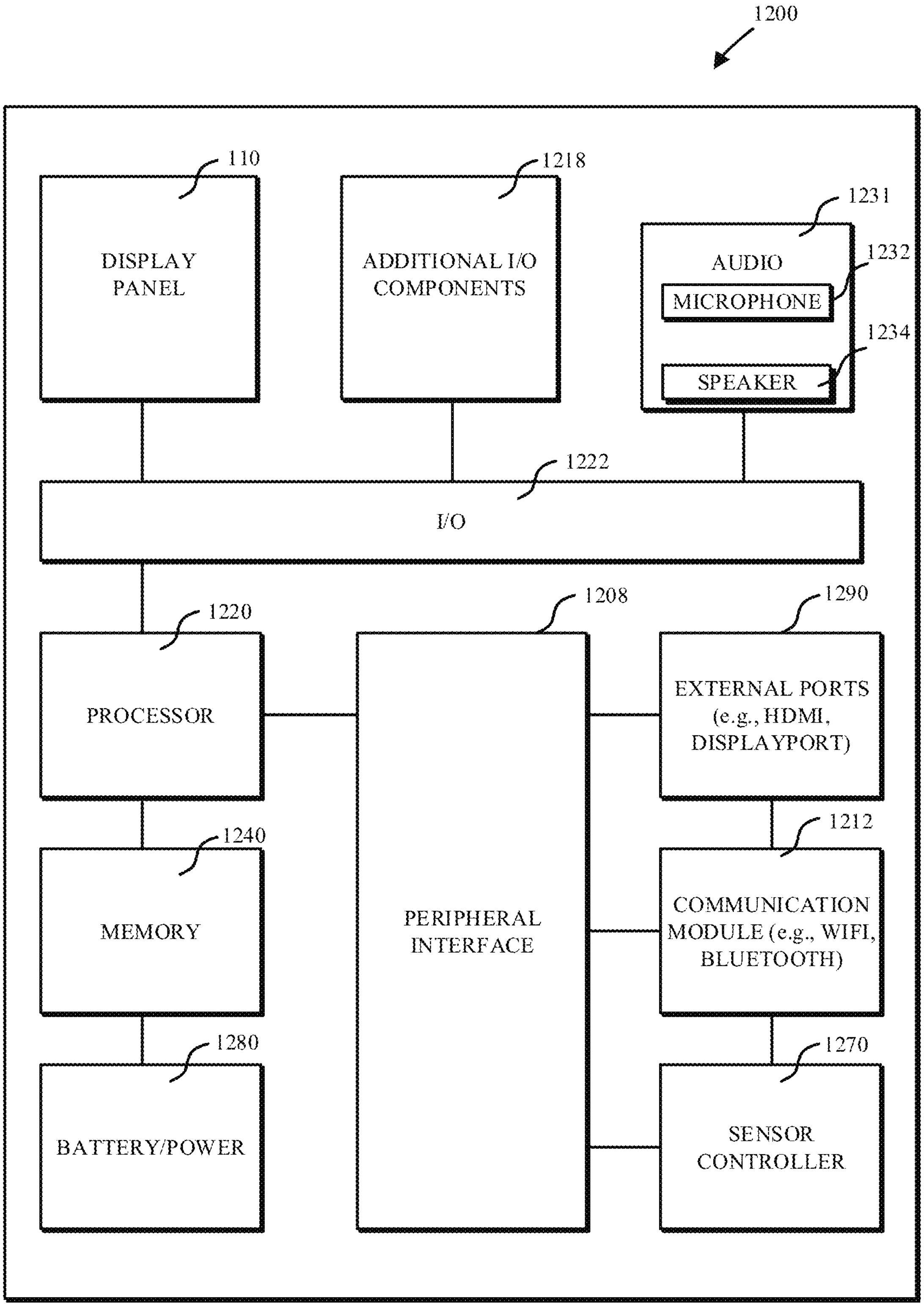
FIG. 12 is a system diagram of a portable electronic device in accordance with an embodiment.

FIG. 12 illustrates a system diagram for an embodiment of a portable electronic device 1200 including a display panel 103 described herein. The portable electronic device 1200 includes a processor 1220 and memory 1240 for managing the system and executing instructions. The memory includes non-volatile memory, such as flash memory, and can additionally include volatile memory, such as static or dynamic random access memory (RAM). The memory 1240 can additionally include a portion dedicated to read only memory (ROM) to store firmware and configuration utilities.

The system also includes a power module 1280 (e.g., flexible batteries, wired or wireless charging circuits, etc.), a peripheral interface 1208, and one or more external ports 1290 (e.g., Universal Serial Bus (USB), HDMI, Display Port, and/or others). In one embodiment, the portable electronic device 1200 includes a communication module 1212 configured to interface with the one or more external ports 1290. For example, the communication module 1212 can include one or more transceivers functioning in accordance with IEEE standards, 3GPP standards, or other communication standards, 4G, 5G, etc. and configured to receive and transmit data via the one or more external ports 1290. The communication module 1212 can additionally include one or more WWAN transceivers configured to communicate with a wide area network including one or more cellular towers, or base stations to communicatively connect the portable electronic device 1200 to additional devices or components. Further, the communication module 1212 can include one or more WLAN and/or WPAN transceivers configured to connect the portable electronic device 1200 to local area networks and/or personal area networks, such as a Bluetooth network.

The display system 1200 can further include a sensor controller 1270 to manage input from one or more sensors such as, for example, proximity sensors, ambient light sensors, or infrared transceivers. In one embodiment the system includes an audio module 1231 including one or more speakers 1234 for audio output and one or more microphones 1232 for receiving audio. In embodiments, the speaker 1234 and the microphone 1232 can be piezoelectric components. The portable electronic device 1200 further includes an input/output (I/O) controller 1222, a display screen 101, and additional I/O components 1218 (e.g., keys, buttons, lights, LEDs, cursor control devices, haptic devices, and others). The display screen 101 and the additional I/O components 1218 may be considered to form portions of a user interface (e.g., portions of the portable electronic device 1200 associated with presenting information to the user and/or receiving inputs from the user).

The various embodiments described herein may be combined in a variety of suitable manners to achieve specified redundancies. In an embodiment, a display panel 103 includes an array of pixel driver chips 110 connected to a corresponding array of LED matrices 115, the array of LED matrices including a first LED matrix 115-A, and the array of pixel driver chips including a first pixel driver chip 110 (See for example, the middle pixel driver chip in FIGS. 3A-3C) connected to the first LED matrix 115-A.

The first LED matrix 115-A may include a plurality of first primary strings 107P of LEDs and a plurality of redundant strings 107R of LEDs. As shown, the first pixel driver chip includes a corresponding plurality of first primary driver terminals 120P coupled with the plurality of first primary strings 107P of LEDs and a corresponding plurality of first redundant driver terminals 120R coupled with the plurality of first redundant strings 107R of LEDs. The first pixel driver chip 110 can additionally include a first portion of pixel driver circuitry 150-0 including a first group of output drivers 140-0 and a first group of driver terminal switches 130, where each first output driver 140-0 is connected to a corresponding first driver terminal switch 130 to select either a first primary driver terminal 120P or a first redundant driver terminal 120R of the first pixel driver chip 110 (middle). The driver terminal switches in accordance with embodiments may be tristate switches.

The array of LED matrices in accordance with embodiments can additionally include a second LED matrix 115-B to which the first pixel driver chip 110 is connected. Similarly, the second LED matrix 115-B includes a plurality of second primary strings 107P of LEDs and a plurality of second redundant strings 107R of LEDs. The first pixel driver chip 110 (middle) includes a corresponding plurality of second primary driver terminals 120P coupled with the plurality of second primary strings 107P of LEDs and a corresponding plurality of second redundant driver terminals 120R coupled with the plurality of second redundant strings 107R of LEDs. As shown, the first pixel driver chip 110 can also include a second portion of pixel driver circuitry 150-1 including a second group of output drivers 140-1 and a second group of second driver terminal switches 130, where each second output driver 140-1 is connected to a corresponding second driver terminal switch 130 to select either a second primary driver terminal 120P or a second redundant driver terminal 120R of the first pixel driver chip 110 (middle).

The array of pixel driver chips may include a second pixel driver chip 110 (e.g. top pixel driver chip 110 illustrated in FIG. 3B) connected to the first LED matrix 115-A and a third LED matrix 115-C. Similarly, the third LED matrix 115-C can include a plurality of third primary strings 107P of LEDs and a plurality of third redundant strings 107R of LEDs. The second pixel driver chip 110 can include a third group of third output drivers 140-0, and a corresponding plurality of third primary driver terminals 120P coupled with the plurality of third primary strings 107P of LEDs in the third LED matrix 115-C and a corresponding plurality of third redundant driver terminals 120R coupled with the plurality of third redundant strings 107R of LEDs in the third LED matrix 115-C. As shown, the second pixel driver chip 110 can include a fourth group of output drivers 140-1, and a corresponding plurality of fourth primary driver terminals 120P coupled with the first primary stings 107P of LEDs in the first LED matrix 115-A, and a corresponding plurality of fourth redundant driver terminals 120R coupled with the plurality of first redundant strings 107R of LEDs in the first LED matrix 115-A. Each third output driver 140-0 can be connected to a corresponding third driver terminal switch 130 to select either a third primary driver terminal 120P or a third redundant driver terminal 120R of the second pixel driver chip (e.g. connected to the third LED matrix 115-C), and each fourth output driver 140-1 can be connected to a corresponding fourth driver terminal switch to select either a fourth primary driver terminal 120P or a fourth redundant driver terminal 120R of the second pixel driver chip (e.g. connected to the first LED matrix 115-A). As shown in FIG. 2A, a plurality of row interconnects 262 can be connected between the first plurality of row terminals 122 of the first pixel driver chip (slice 0) and a corresponding second plurality of row terminals 122 of the second pixel driver chip (slice 1). Furthermore, each row interconnect 262 can be coupled to a row of primary and redundant LEDs in both the plurality of first redundant strings 107R of LEDs and the plurality of first primary strings 107P of LEDs in the first LED matrix 115-A. Each of the first and second portions 150-0, 150-1 of pixel driver circuitry can include independent logic to each independently receive control and pixel bits.

In an embodiment, first LED matrix 115-A and the second LED matrix 115-B are not coupled to an output driver of another pixel driver chip in the array of pixel driver chips, see for example FIG. 3C. A plurality of row interconnects 262 can be connected to a first plurality of row terminals 122 of the first pixel driver chip 110 (e.g. middle chip in FIG. 3C), and each row interconnect 262 is coupled to a row of primary and redundant LEDs in both the plurality of first redundant strings 107R of LEDs and the plurality of first primary strings 107P of LEDs in the first LED matrix 115-A. As shown in FIG. 2B, the pixel driver chip 110 may similarly be coupled to a row of primary and redundant LEDs in both the plurality of first redundant strings 107R of LEDs and the plurality of first primary strings 107P of LEDs in the second LED matrix 115-B. In both cases, the row interconnects 262 may not be joined to adjacent pixel driver chips 110 as shown in FIG. 2A.

The pixel driver chips 110 in accordance with embodiments may include additional redundancy features. In an embodiment, a redundancy circuit 150-R (see FIG. 5, for example) can be coupled between the first portion of pixel driver circuitry 150-0 and the second portion of pixel driver circuitry 150-1. A first redundancy circuit selection switch 170-R can be connected between the redundant output driver 140-R and the first driver terminal switch 130 (in the second portion of pixel driver circuitry 150-0), and a second redundancy circuit selection switch 170-1R connected between the redundant output driver 140-R and the second driver terminal switch 130 (in the second portion of pixel driver circuitry 150-1). Further, a first digital input 335 and a second digital input 345 can be connected to a multiplexer 151 in the redundancy circuit 150-R. It is to be appreciated additional redundancy circuit configurations are contemplated, and embodiments are not so limited. Redundancy may be included in a variety of functional blocks within the pixel driver circuitry. For example, redundant current sources can be included. In an embodiment, the first portion of pixel driver circuitry includes a first redundant current source contact pad (e.g. contact pad 122 of FIG. 1B), and the second portion of the pixel driver circuitry includes a second redundant current source contact pad (e.g. contact pad 122 of FIG. 1B). A variety of redundant contact pads may be included with redundant functional blocks.

In utilizing the various aspects of the embodiments, it would become apparent to one skilled in the art that combinations or variations of the above embodiments are possible for forming a display panel redundancy scheme. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A display panel comprising:

an array of pixel driver chips connected to a corresponding array of LED matrices, the array of LED matrices including a first LED matrix, and the array of pixel driver chips including a first pixel driver chip connected to the first LED matrix;

wherein the first LED matrix includes a plurality of first primary strings of LEDs and a plurality of first redundant strings of LEDs;

wherein the first pixel driver chip includes a corresponding plurality of first primary driver terminals coupled with the plurality of first primary strings of LEDs and a corresponding plurality of first redundant driver terminals coupled with the plurality of first redundant strings of LEDs; and wherein the first pixel driver chip includes a first portion of pixel driver circuitry comprising:

a first group of first output drivers; and a first group of first driver terminal switches;

wherein each first output driver is connected to a corresponding first driver terminal switch that switches between a first primary driver terminal and a first redundant driver terminal to select either the first primary driver terminal or the first redundant driver terminal of the first pixel driver chip.

2. The display panel of claim 1, wherein each first driver terminal switch is a tristate switch.

3. The display panel of claim 1, wherein the array of LED matrices includes a second LED matrix, and the first pixel driver chip is connected to the second LED matrix;

wherein the second LED matrix includes a plurality of second primary strings of LEDs and a plurality of second redundant strings of LEDs;

wherein the first pixel driver chip includes a corresponding plurality of second primary driver terminals coupled with the plurality of second primary strings of LEDs and a corresponding plurality of second redundant driver terminals coupled with the plurality of second redundant strings of LEDs.

4. The display panel of claim 3, wherein the first pixel driver chip includes a second portion of pixel driver circuitry comprising:

a second group of second output drivers; and a second group of second driver terminal switches;

wherein each second output driver is connected to a corresponding second driver terminal switch to select either a second primary driver terminal or a second redundant driver terminal of the first pixel driver chip.

5. The display panel of claim 4, wherein the array of pixel driver chips includes a second pixel driver chip connected to the first LED matrix and a third LED matrix;

wherein the third LED matrix includes a plurality of third primary strings of LEDs and a plurality of third redundant strings of LEDs;

wherein the second pixel driver chip includes:

a third group of third output drivers;

a corresponding plurality of third primary driver terminals coupled with the plurality of third primary strings of LEDs in the third LED matrix and a corresponding plurality of third redundant driver terminals coupled with the plurality of third redundant strings of LEDs in the third LED matrix; and a fourth group of fourth output drivers;

a corresponding plurality of fourth primary driver terminals coupled with the plurality of first primary strings of LEDs in the first LED matrix and a corresponding plurality of fourth redundant driver terminals coupled with the plurality of first redundant strings of LEDs in the first LED matrix, wherein each third output driver is connected to a corresponding third driver terminal switch to select either a third primary driver terminal or a third redundant driver terminal of the second pixel driver chip, and each fourth output driver is connected to a corresponding fourth driver terminal switch to select either a fourth primary driver terminal or a fourth redundant driver terminal of the second pixel driver chip.

6. The display panel of claim 5, further comprising a plurality of row interconnects connected between a first plurality of row terminals of the first pixel driver chip and a corresponding second plurality of row terminals of the second pixel driver chip, wherein each row interconnect of the plurality of row interconnects is coupled to both the plurality of first redundant strings of LEDs and the plurality of first primary strings of LEDs in the first LED matrix.

7. The display panel of claim 4, wherein the first and second portions of pixel driver circuitry include independent logic to each independently receive control and pixel bits.

8. The display panel of claim 4, wherein the first LED matrix and the second LED matrix are not coupled to an output driver of another pixel driver chip in the array of pixel driver chips.

9. The display panel of claim 8, further comprising a plurality of row interconnects connected to a first plurality of row terminals of the first pixel driver chip, wherein each row interconnect of the plurality of row interconnects is coupled to both the plurality of first redundant strings of LEDs and the plurality of first primary strings of LEDs in the first LED matrix.

10. The display panel of claim 4, further comprising a redundancy circuit coupled between the first portion of pixel driver circuitry and the second portion of pixel driver circuitry.

11. The display panel of claim 10, wherein the redundancy circuit includes a redundant output driver.

12. The display panel of claim 11, further comprising:

a first redundancy circuit selection switch between the redundant output driver and the first driver terminal switch; and a second redundancy circuit selection switch between the redundant output driver and the second driver terminal switch.

13. The display panel of claim 11, wherein a first digital input and a second digital input are connected to a multiplexer in the redundancy circuit.

14. The display panel of claim 4, wherein:

the first portion of pixel driver circuitry includes a first redundant current source contact pad for the first pixel driver chip; and the second portion of pixel driver circuitry includes a second redundant current source contact pad for the first pixel driver chip.

15. A pixel driver chip comprising:

a plurality of first primary driver terminals and a corresponding plurality of first redundant driver terminals; and a first portion of pixel driver circuitry comprising:

a first group of first output drivers; and a first group of first driver terminal switches;

wherein each first output driver is connected to a corresponding first driver terminal switch that switches between a first primary driver terminal and a first redundant driver terminal to select either the first primary driver terminal or the first redundant driver terminal.

16. The pixel driver chip of claim 15, further comprising:

a plurality of second primary driver terminals and a corresponding plurality of second redundant driver terminals; and a second portion of pixel driver circuitry comprising:

a second group of second output drivers; and a second group of second driver terminal switches;

wherein each second output driver is connected to a corresponding second driver terminal switch to select either a second primary driver terminal or a second redundant driver terminal.

17. The pixel driver chip of claim 16, further comprising a redundancy circuit coupled between the first portion of pixel driver circuitry and the second portion of pixel driver circuitry.

18. The pixel driver chip of claim 17, wherein the redundancy circuit includes a redundant output driver.

19. The pixel driver chip of claim 18, further comprising:

a first redundancy circuit selection switch between the redundant output driver and the first driver terminal switch; and a second redundancy circuit selection switch between the redundant output driver and the second driver terminal switch.

20. The pixel driver chip of claim 18, wherein:

the first portion of pixel driver circuitry includes a first data input; and the second portion of pixel driver circuitry includes a second data input;

wherein the first data input and the second data input are connected to a multiplexer in the redundancy circuit.

21. The pixel driver chip of claim 16, wherein:

the first portion of pixel driver circuitry includes a plurality of non-redundant first row terminals; and the second portion of pixel driver circuitry includes a plurality of non-redundant second row terminals.

* * * * *